UNITED STATES PATENT OFFICE.

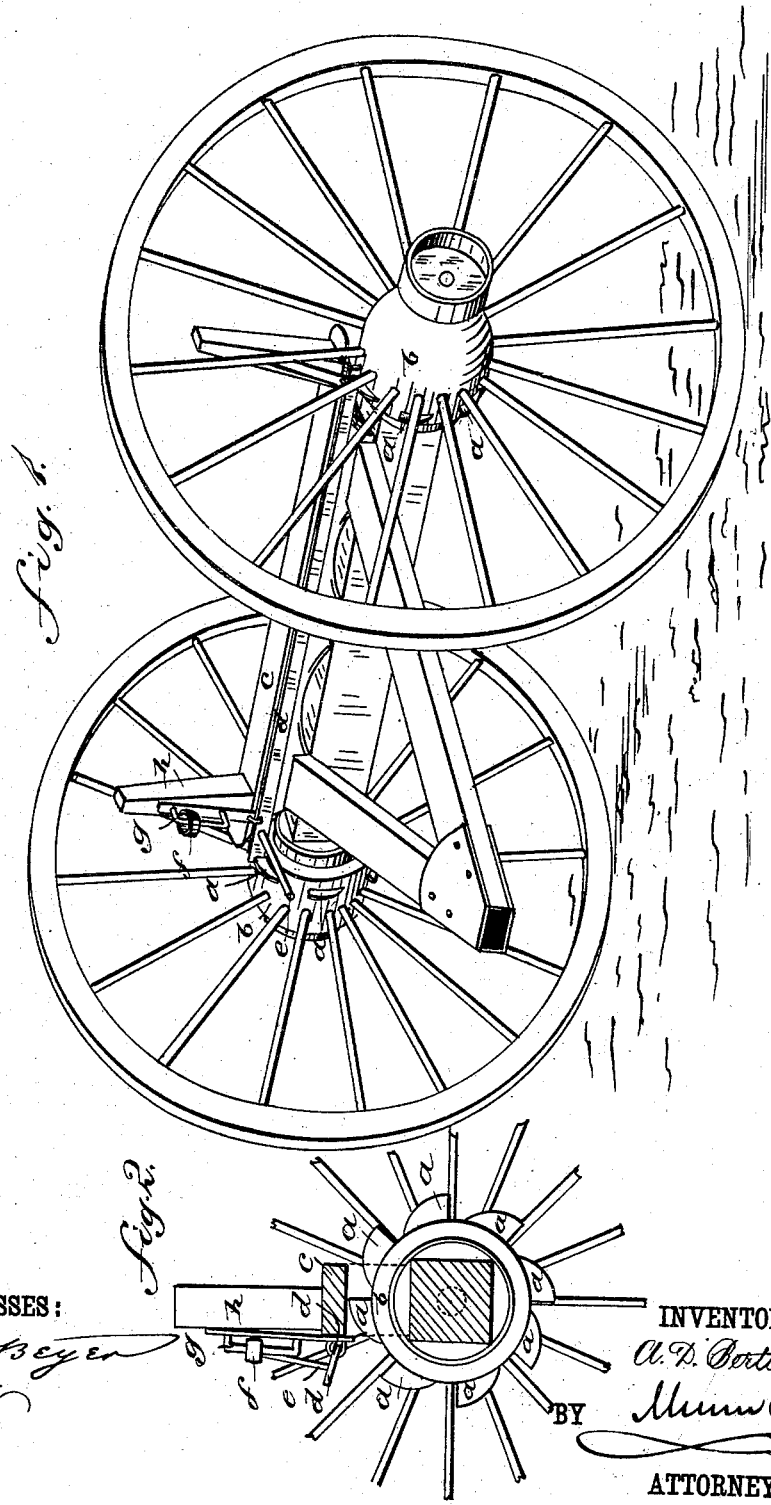

ALEXANDER D. BERTIER, OF HANNIBAL, MISSOURI.

WAGON-BRAKE.

SPECIFICATION forming part of Letters Patent No. 267,828, dated November 21, 1882.

Application filed September 12, 1882. (Model.)

*To all whom it may concern:*

Be it known that I, ALEXANDER D. BERTIER, of Hannibal, in the county of Marion and State of Missouri, have invented a new and Improved Wagon-Brake, of which the following is a full, clear, and exact description.

My invention consists of ratchets applied to the hubs of the wheels, and a latch to fall into them to automatically chock the wheels and hold the wagon against running backward when the horses stop for rest on steep hills, and thus avoid the labor of applying and releasing the brakes by the driver, as now required, to relieve the horses of the tension necessary to retain the wagon in its position, all as hereinafter fully described.

Reference is to be had to the accompanying drawings, forming part of this specification, in which similar letters of reference indicate corresponding parts in both the figures.

Figure 1 is a perspective view of the hind gear of a wagon with my improved brake attachment. Fig. 2 is a detail of the same as seen by a transverse section of the axle.

I propose to apply ratchet-projections $a$ to the hubs $b$ of the hind wheels by means of strong bands, or other approved means by which they may be strongly attached, the said projections being set so as to hold the wheels against turning backward, and to the bolster $c$, I hinge a latch-bar, $d$, so that while it offers no obstruction to the forward motion of the wheels it automatically locks them against turning backward by dropping behind the projections and being supported by the bolster.

In order that the latch may be disconnected and supported above the ratchets, so as not to act when it is required to allow the wagon to run back, a lever, $e$, is attached to the latch to swing it up, as shown in Fig. 2, and a ring, $f$, is fixed on a long staple, $g$, attached to the stake $h$, for holding up the lever.

This brake is attached to the bolster and independently of the wagon-bed, so that it is always in position for use, whereas some brakes attached to the bed are not available when the wagon is to be used without the bed, as is sometimes the case.

Having thus fully described my invention, I claim as new and desire to secure by Letters Patent—

The combination of lever $e$ and a holder, $f$, with the latch-bar $d$, jointed to the bolster, and the ratchet-projections attached to the wheel-hubs, substantially as described.

ALEXANDER D. BERTIER.

Witnesses:
 M. B. JONES,
 F. S. CHAPMAN.